(12) United States Patent
Ichihara

(10) Patent No.: US 10,345,937 B2
(45) Date of Patent: Jul. 9, 2019

(54) ELECTRONIC DEVICE WITH A BACKLIGHT AND CAPACITIVE TOUCH PANEL AND METHOD FOR CONTROLLING ELECTRONIC DEVICE SO AS TO SUPPRESS ERROR DETECTION OF A TOUCH OPERATION

(71) Applicant: CANON KABUSHIKI KAISHA, Tokyo (JP)

(72) Inventor: Atsushi Ichihara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 199 days.

(21) Appl. No.: 14/993,635

(22) Filed: Jan. 12, 2016

(65) Prior Publication Data

US 2016/0202821 A1 Jul. 14, 2016

(30) Foreign Application Priority Data

Jan. 14, 2015 (JP) ................................ 2015-005077

(51) Int. Cl.
*G06F 3/045* (2006.01)
*G06F 3/041* (2006.01)
*G06F 3/044* (2006.01)
*G09G 3/34* (2006.01)
*G09G 3/36* (2006.01)

(52) U.S. Cl.
CPC ............ *G06F 3/0412* (2013.01); *G06F 3/044* (2013.01); *G09G 3/3406* (2013.01); *G09G 3/3648* (2013.01); *G09G 3/3677* (2013.01); *G09G 2300/0426* (2013.01); *G09G 2310/08* (2013.01); *G09G 2320/064* (2013.01); *G09G 2330/06* (2013.01)

(58) Field of Classification Search
CPC ..... G06F 3/0412; G06F 3/044; G09G 3/3406; G09G 3/3648
USPC .......................................................... 345/174
See application file for complete search history.

(56) References Cited

U.S. PATENT DOCUMENTS

| 2004/0145560 A1* | 7/2004 | Kim ..................... G09G 3/3406 |
| | | 345/102 |
| 2006/0284857 A1* | 12/2006 | Oh ........................ G06F 1/3203 |
| | | 345/173 |
| 2007/0024574 A1* | 2/2007 | Wu ...................... G09G 3/3406 |
| | | 345/102 |
| 2009/0115767 A1* | 5/2009 | Chang ................... G06F 1/3218 |
| | | 345/212 |

(Continued)

FOREIGN PATENT DOCUMENTS

JP    2013-235197 A    11/2013

*Primary Examiner* — Jonathan M Blancha
(74) *Attorney, Agent, or Firm* — Cowan, Liebowitz & Latman, P.C.

(57) ABSTRACT

Provided an electronic device capable of suppressing the effects of noise caused by driving of a backlight, and preventing an erroneous detection of an operation on a touch panel. The electronic device includes a display, a touch panel, which is arranged on a display surface side of the display and is capable of detecting a touch operation, a backlight of the display, a backlight control unit configured to drive and control a current of the backlight based on pulse width modulation, and a CPU. The CPU is configured to cause the backlight control unit to drive and control the backlight at a current drive frequency different from a sub-scanning frequency of the touch panel.

14 Claims, 5 Drawing Sheets

(56) References Cited

U.S. PATENT DOCUMENTS

| | | | | |
|---|---|---|---|---|
| 2012/0038583 A1* | 2/2012 | Westhues | ............. | G06F 3/0412 345/174 |
| 2015/0115813 A1* | 4/2015 | Hussain | ............... | G09G 3/3406 315/186 |
| 2015/0199044 A1* | 7/2015 | He | .......................... | G06F 3/044 345/174 |
| 2015/0355774 A1* | 12/2015 | Johansson | ............. | G06F 3/0416 345/173 |
| 2015/0370383 A1* | 12/2015 | Oyama | ................ | G06F 3/0418 345/173 |

* cited by examiner

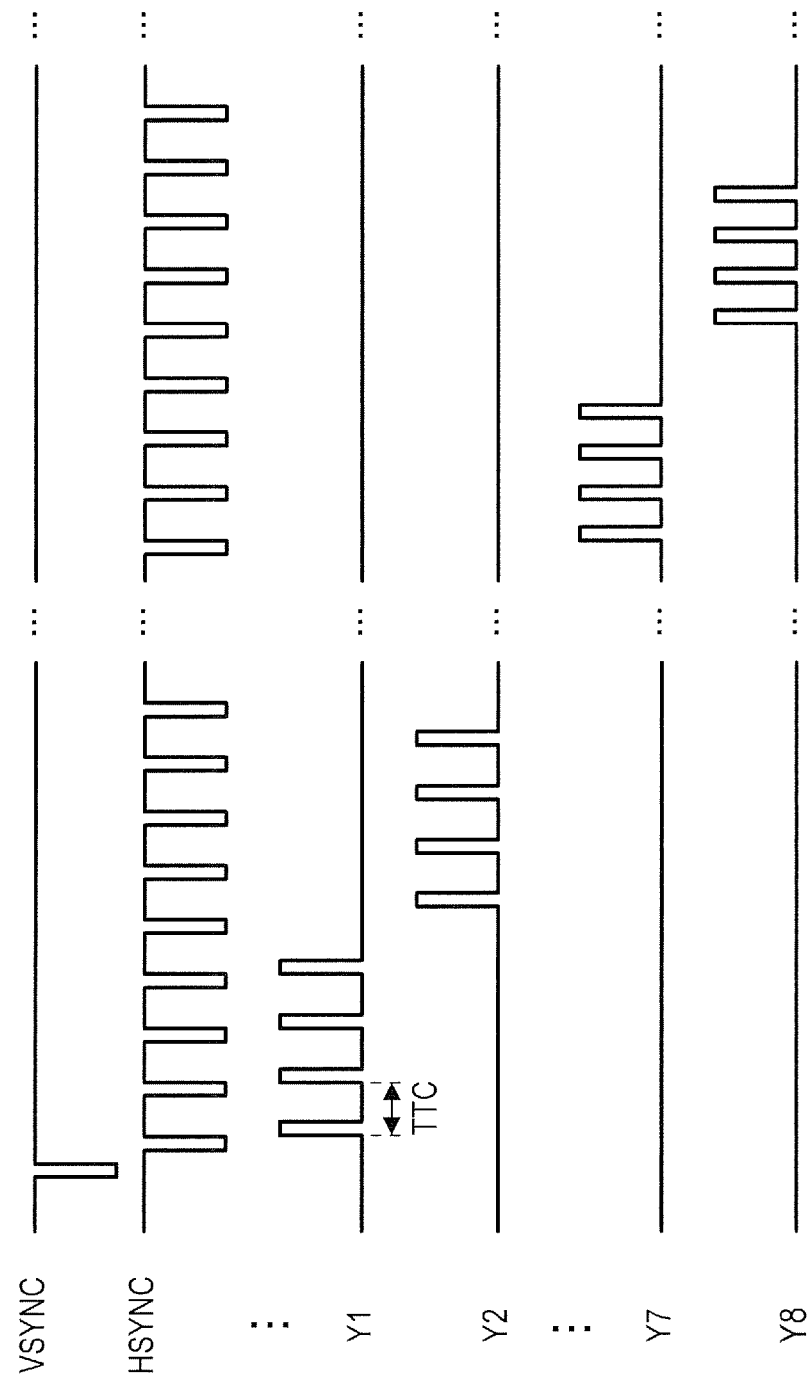

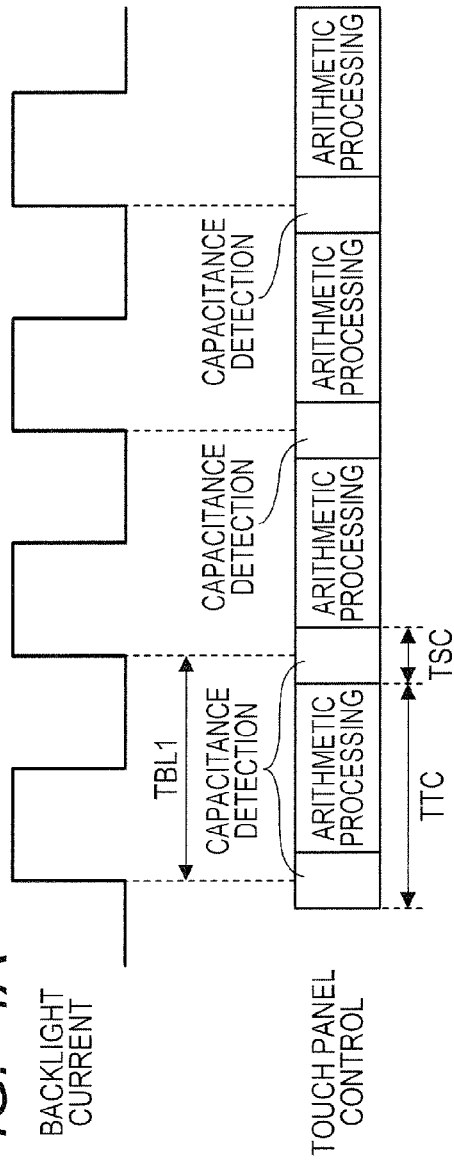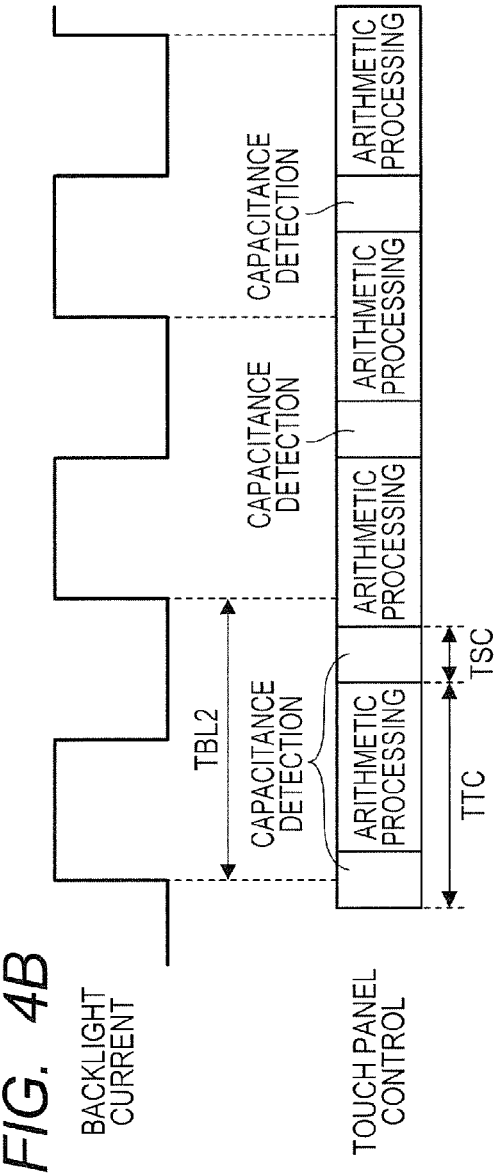

ELECTRONIC DEVICE WITH A BACKLIGHT AND CAPACITIVE TOUCH PANEL AND METHOD FOR CONTROLLING ELECTRONIC DEVICE SO AS TO SUPPRESS ERROR DETECTION OF A TOUCH OPERATION

BACKGROUND OF THE INVENTION

Field of the Invention

The present invention relates to an electronic device and a method for controlling an electronic device.

Description of the Related Art

As a display monitor on a mobile communications terminal, such as a smartphone, or a digital camera, a liquid crystal monitor equipped with a touch panel is used. For example, a capacitive touch panel that supports multi-touch or gesture operations is often mounted. In a liquid crystal monitor equipped with a touch panel, the touch panel is arranged on the display surface side of the liquid crystal monitor, as illustrated in FIG. 6. In FIG. 6, a liquid crystal monitor is illustrated that includes a touch panel 601, a thin-film transistor (TFT) panel 602 of the liquid crystal monitor (display), and a backlight 603 of the liquid crystal monitor.

In this configuration, the touch panel is arranged above the liquid crystal monitor. As a result, the touch panel is affected by noise caused by driving of the liquid crystals and driving of the backlight. In particular, for an in-cell touch panel or an on-cell touch panel, those effects are substantial due to the touch panel being arranged above liquid crystal electrodes or above a color filter without a glass sheet or a film being arranged between the touch panel and the liquid crystal electrodes or the color filter.

As the backlight of the liquid crystal monitor, a white light-emitting diode is mainly used. The emitted brightness is determined based on a value of the current flowing to the white light-emitting diode. There are two methods of controlling the current of a light-emitting diode, namely, a method for controlling the current value by a direct current, and a method called pulse width modulation control (PWM control), in which the current value of the direct current is fixed and a timing at which current flows is controlled based on a pulse width. When direct current control is performed, the color hue of the white light-emitting diode changes based on the current value. Therefore, for a monitor to be used to confirm on the monitor an image taken by a digital camera, PWM control is often performed in order to prevent the color hue from changing depending on the brightness.

However, in PWM control, noise is produced due to the switching that is repeatedly performed in order to turn the backlight current on and off. This noise affects the touch panel. When a capacitance detection frequency of the touch panel for detecting an operation on the touch panel and a PWM drive frequency of the backlight current match, the effects of this noise are increased, which can cause an output signal of the touch panel to fluctuate, resulting in erroneous detection of an operation.

For example, in Japanese Patent Application Laid-Open No. 2013-235197, a technology is disclosed in which noise caused by driving of the backlight is reduced by synchronizing touch detection of the touch panel and driving of the backlight.

However, in the technology disclosed in Japanese Patent Application Laid-Open No. 2013-235197, backlights need to be arranged parallel to a region at which touch detection of the touch panel is performed. Further, control for synchronizing touch detection of the touch panel and driving of the backlights needs to be performed for each backlight that is connected in parallel, and hence the touch detection of the touch panel and the control of the backlights are more complex.

SUMMARY OF THE INVENTION

According to one embodiment of the present invention, there is provided an electronic device, including: a displaying unit; a touch panel arranged on a display surface side of the displaying unit, the touch panel including a plurality of column electrodes and a plurality of row electrodes, which are arranged orthogonal to each other and are configured to detect a touch operation; a backlight configured to control a brightness of the displaying unit; a backlight control unit configured to control a current of the backlight based on pulse width modulation; and a control unit configured to cause the backlight control unit to drive and control the backlight at a second frequency different from a natural number multiple of a first frequency for detecting a signal at each of crossing points between the plurality of column electrodes and the plurality of row electrodes.

Further features of the present invention will become apparent from the following description of exemplary embodiments with reference to the attached drawings.

BRIEF DESCRIPTION OF THE DRAWINGS

FIG. 3 is a diagram for illustrating an example of a detection timing of the touch panel according to this embodiment.

FIG. 4A and FIG. 4B are diagrams for illustrating examples of the detection timing of the touch panel and a drive timing of a backlight according to this embodiment.

DESCRIPTION OF THE EMBODIMENTS

Preferred embodiments of the present invention will now be described in detail in accordance with the accompanying drawings.

Figure 1:
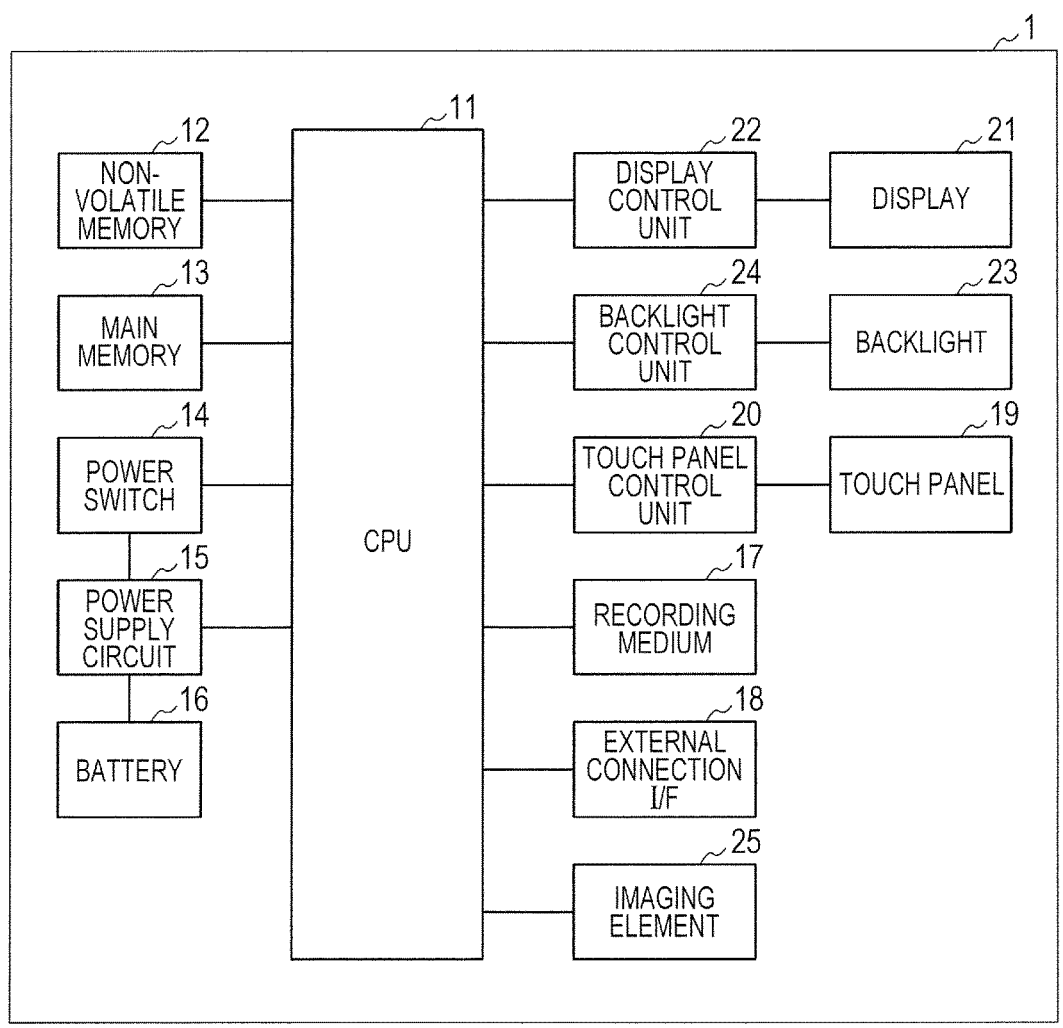
FIG. 1 is a diagram for illustrating a configuration example of an electronic device according to an embodiment of the present invention.

FIG. 1 is a block diagram for illustrating a configuration example of an electronic device 1 according to an embodiment of the present invention. A central processing unit (CPU) 11 is a microcomputer configured to control a system of the electronic device 1. The CPU 11, which serves as a control unit, is configured to perform control relating to each function unit of the electronic device 1 by loading and executing in a main memory 13 programs stored in a non-volatile memory 12. For example, the CPU 11 is configured to control a current drive frequency of a backlight 23 based on a capacitance detection frequency of a touch panel 19 for detecting a touch operation on the touch panel 19 in a manner described later.

The non-volatile memory 12 is a memory unit in which various programs to be operated by the CPU 11 are stored. The main memory 13 is formed of, for example, a random access memory (RAM). For example, the CPU 11 is configured to control each unit in the electronic device 1 based on the programs stored in the non-volatile memory 12 by using the main memory 13 as a work memory. Further, when the electronic device has a camera function including an imaging element, a lens, and the like (not shown), the main memory 13 also used as a memory configured to store taken still images and moving images. In this case, the main memory 13 has a memory capacity that is sufficient to store a predetermined number of still images and a predetermined duration of moving images.

A power switch (SW) 14 is a switch configured to control on and off of the electronic device 1. A power supply circuit 15 is a circuit configured to supply power to each of the units in the electronic device 1. When the power SW 14 is ON, the power supply circuit 15 supplies power to each of the units in the electronic device 1. Further, operation of the power supply circuit 15 is controlled in response to the power supply circuit 15 receiving from the CPU 11 a signal instructing to advance to or to return from a power saving mode. A battery 16 is a power supply for the electronic device 1. Note that, the power supply for the electronic device 1 is not limited to the battery 16, and an alternating-current adapter, for example, may be used. A recording medium 17 is capable of being inserted into the electronic device 1. An external connection interface (I/F) 18, which conforms to the Universal Serial Bus (USB), the High-Definition Multimedia Interface (HDMI (trademark)), or the like, is an interface enabling connection to an external device.

The touch panel (touch sensor) 19, which is a capacitive touch panel, for example, is configured to generate a capacitance with respect to a conductive object, such as a finger, in response to a touch operation. The touch panel 19 is arranged, for example, in a two-dimensional planar shape on a display surface side of a display 21, which serves as display unit. A touch panel control unit 20 is a controller circuit configured to control the touch panel 19. The touch panel control unit 20 enables operations performed on the touch panel 19 to be detected by transmitting a capacitance detected signal to the touch panel 19, calculating the detected coordinates and region of the touch operation based on a detected signal from the touch panel 19, and transmitting the calculated coordinates and region to the CPU 11.

The display 21 serving as the display unit is a display monitor formed of a liquid crystal panel, for example. A display control unit 22 is a controller circuit configured to receive a control signal of display data from the CPU 11, and output a display signal for displaying an image on the display 21 by processing the received control signal.

The backlight 23 is a backlight of the display 21. The backlight 23 is formed of, for example, a white light-emitting diode. A backlight control unit 24, which is a controller circuit configured to control the brightness of the backlight 23, controls drive of the backlight 23. The backlight control unit 24 is configured to control the current flowing to the backlight 23 based on pulse width modulation (PWM), and as a result, the backlight 23 is controlled by PWM. An imaging element 25 is an optical sensor configured to convert an optical image formed as an object through a lens (not shown) into an electric signal.

Figure 2A:
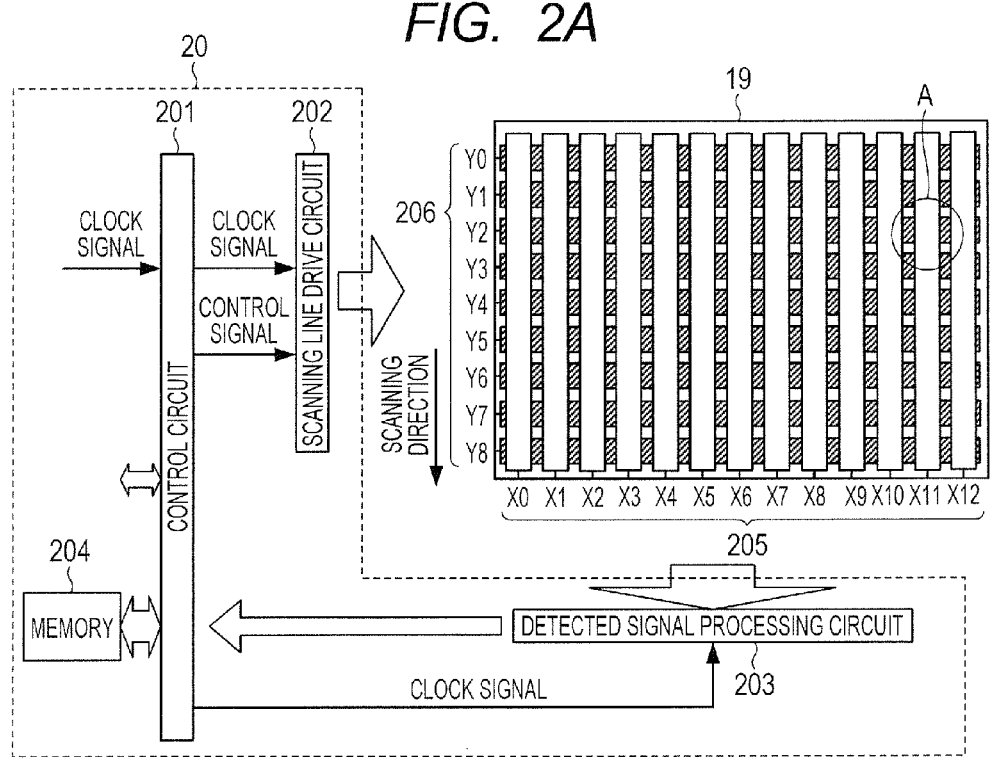
FIG. 2A and FIG. 2B are diagrams for illustrating a touch panel according to this embodiment.
Figure 2B:
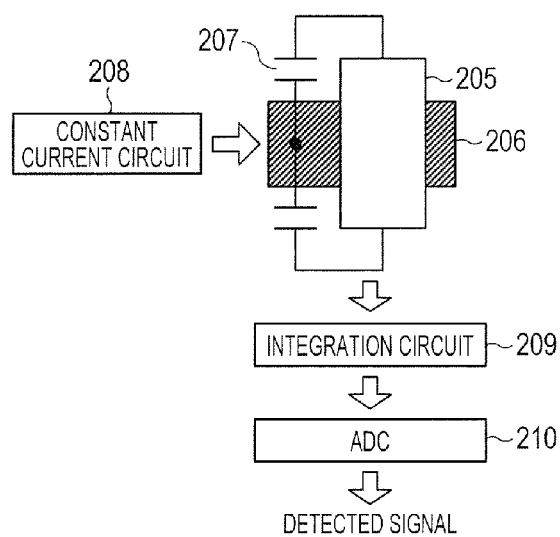

FIG. 2A and FIG. 2B are diagrams for illustrating a configuration example of the touch panel 19 and the touch panel control unit 20. The touch panel 19 is, for example, a capacitive touch panel. The touch panel 19 includes a plurality of column electrodes 205 arranged in columns, and a plurality of row electrodes 206 arranged in rows. The column electrodes 205 and the row electrodes 206 are arranged orthogonal to each other, with the column electrodes 205 being used as scanning lines and the row electrodes 205 being used as reading lines.

FIG. 2B is an enlarged view of an electrode crossing point section indicated by the circle A of FIG. 2A. The column electrode 205 has a predetermined fixed potential, and the row electrode 206 is connected to constant current circuit 208. When a slight current is caused to flow in the row electrode 206 by the constant current circuit 208, a charge generated between the column electrode 205 and the row electrode 206 accumulates in a mutual capacitance 207. When accumulation is performed only once, there is a high likelihood that the accumulation may be affected by noise due to the fact that the accumulation time is longer in order to obtain a signal having a sufficient level as the detected signal for each crossing point between one column electrode 205 and one row electrode 206.

Therefore, sub-scanning is performed for carrying out accumulation a plurality of times in a short period of time for each crossing point, and the accumulated charges are integrated by an integration circuit 209. A measurement result of one crossing point (one scan) is converted by an analog-to-digital (A/D) converter 210 into a digital signal. Whether or not a touch operation has been performed on the touch panel 19 may be determined by measuring as a capacitance change amount an amount of change in the detected signal output from the A/D converter 210. The integration circuit 209 and the A/D converter 210 are arranged in a detected signal processing circuit 203, for example.

In FIG. 2A, a control circuit 201 includes a phase lock loop (PLL) circuit configured to generate a clock signal by using an external clock input or an internal oscillator circuit as an oscillation source. The period of one scan or the period of one sub-scan may be changed by the PLL circuit of the control circuit 201. A scanning line drive circuit 202 and the detected signal processing circuit 203 are driven based on clock signals supplied by the control circuit 201.

Further, the control circuit 201 is configured to successively detect whether or not a signal value of the detected signals at each electrode crossing point output from the detected signal processing circuit 203 exceeds an arbitrary touch determination threshold. The control circuit 201 is configured to transfer, when the signal value of the detected signal exceeds the touch determination threshold, data including a touch detection flag to the memory 204. The control circuit 201 is configured to group, when the scanning of one frame, that is, the scanning or all the crossing points of the electrodes in the touch panel 19, is complete, touch detected regions and calculate a center of gravity of the touch positions based on the detection data of one frame stored in the memory 204. As a result, the control circuit 201 calculates a touch detection count and touch detection coordinates.

The scanning line drive circuit 202 is configured to output scan pulses Y0 to Y8, and successively select and drive the row electrodes 206 (Y0 to Y8) as scanning lines. A slight current is caused to flow in the selected row electrodes 206 by the constant current circuit 208. A sub-scan count per scanning line may be arbitrarily changed based on a command from the CPU 11 to the control circuit 201. The detected signal processing circuit 203 is configured to successively select the column electrodes 205 as reading lines, and read detected signals X0 to X8.

FIG. 3 is a diagram for illustrating an example of a capacitance detection timing of the touch panel 19 performed by the touch panel control unit 20. In FIG. 3, VSYNC represents a vertical synchronization signal indicating display of one frame of the display 21, and HSYNC represents a horizontal synchronization signal indicating rendering of one line of the display 21.

In order to detect a touch operation on the touch panel 19 together with display on the display 21, the capacitance at the crossing points of all of the electrodes of the touch panel 19 needs to be detected within a one-frame (1 VSYNC) period, and the touch detection count and the touch detection coordinates need to be calculated. As described above, in order to perform sub-scanning to carry out accumulation a plurality of times for each crossing point, and perform capacitance detection and arithmetic processing of all points within one frame, the time that is allowed for one sub-scan is, at most, a period TTC, which is obtained by dividing the frame rate by the row electrode count and the sub-scan count.

In the example illustrated in FIG. 3, when the scan pulses Y1 to Y8 are at a high level (ON), sub-scanning, namely, capacitance detection, is performed. Further, when the scan pulses Y1 to Y8 are at a low level (OFF), arithmetic processing for generating a detected signal via the integration circuit 209 and the A/D converter 210 illustrated in FIG. 2B is performed.

For example, because the touch panel 19 is also affected by noise caused by gate driving of the TFT pixels of the display (liquid crystal monitor) 21, capacitance detection of the touch panel 19 is often performed during a blanking period of horizontal synchronization or when the gate voltage stable. In particular, for an in-cell touch panel or an on-cell touch panel, because the electrodes of the TFT also overlap the electrodes of the touch panel, the sub-scanning frequency of the touch panel is synchronized with the horizontal synchronization frequency HSYNC.

FIG. 4A and FIG. 4B are diagrams for illustrating examples of a capacitance detection timing of the touch panel 19 and a drive timing of the backlight 23 performed by the touch panel control unit 20. In the example illustrated in FIG. 4A, the period TTC for which the touch panel control unit 20 controls the touch panel 19 (period for performing sub-scanning) and a current drive period TBL1 of the backlight 23 are synchronized. In this case, a situation occurs in which the timing of the switching of the current of the backlight 23 and a timing TSC of the sub-scanning (capacitance detection) by the touch panel 19 always match.

If the timing of the switching of the current of the backlight 23 and the timing TSC always match, the detected signals from the touch panel 19 vary in response to the effects on the touch panel 19 of the noise caused by the switching of the current of the backlight 23. As a result of the detected signals from the touch panel 19 varying, detection errors may occur, such as a touch operation not being detected even though a touch operation has been performed, or a touch operation being detected even though a touch operation has not been performed.

In the example illustrated in FIG. 4B, the period TTC for which the touch panel control unit 20 controls the touch panel 19 and a current drive period TBL2 of the backlight 23 are set to frequencies of a different period. It can be seen that setting those periods to different frequencies in this manner reduces the number of occasions that the timing of the switching of the current of the backlight 23 and the timing of the sub-scanning (capacitance detection) by the touch panel 19 match. Therefore, the effects of noise caused by the switching of the current of the backlight 23 can be suppressed, and detection errors of a touch operation on the touch panel 19 can be prevented.

Therefore, in this embodiment, as illustrated by the example in FIG. 4B, based on the period TTC for which the touch panel control unit 20 controls the touch panel 19, the period TTC and the current drive period TBL2 of the backlight 23 are set to frequencies of a different period. More specifically, the current drive period TBL2 of the backlight 23 is set to a frequency that is different from a natural number multiple of the period TTC for which the touch panel control unit 20 controls the touch panel 19. For example, the CPU 11 acquires the period TTC for which the touch panel control unit 20 controls the touch panel 19. Then, the CPU 11 sets a current drive period TBL when the backlight 23 is driven by PWM in the backlight control unit 24 so that the set period is different from the acquired period TTC (and periods of multiples thereof).

Note that, the period TTC may be acquired by setting in advance the period TTC for which the touch panel control unit 20 controls the touch panel 19, storing information on the period TTC in the non-volatile memory 12, and reading the information by the CPU 11. Further, setting the current drive period of the backlight 23 to be after the period at which the touch panel 19 is controlled enables the effects of noise to be reduced even further, because the number of times that the current of the backlight 23 is switched is less than the number of times that capacitance detection is performed by the touch panel 19.

Figure 5A:
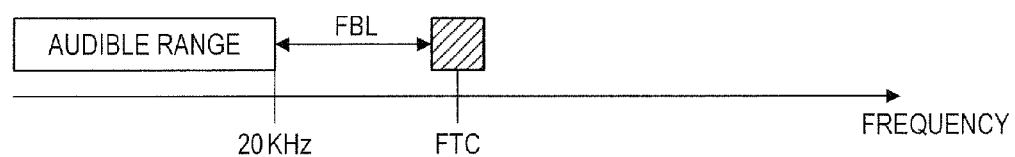
FIG. 5A, FIG. 5B, and FIG. 5C are diagrams for illustrating setting examples of a current drive frequency of the backlight according to this embodiment.
Figure 5B:
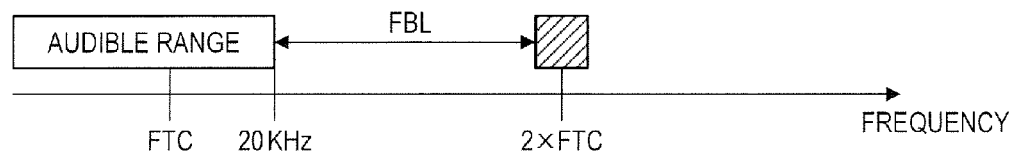
Figure 5C:
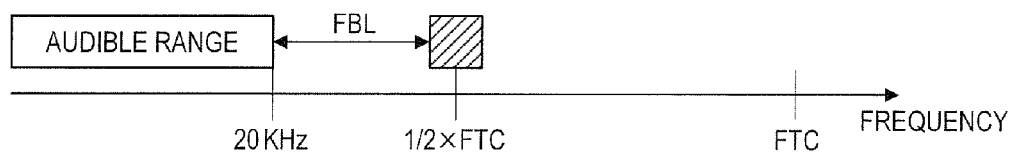
Figure 6:
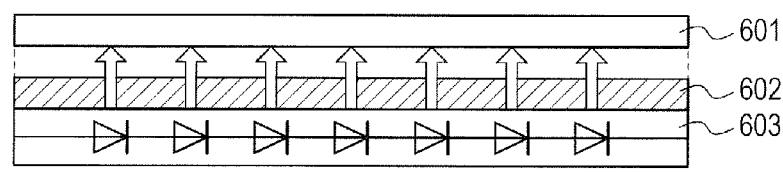
FIG. 6 a cross-sectional diagram illustrating a configuration of a liquid crystal monitor equipped with a touch panel.

FIG. 5A, FIG. 5B, and FIG. 5C are diagrams for illustrating setting regions of the current drive frequency of the backlight 23 according to this embodiment. A frequency of 20 KHz or less corresponds to the audible range of a typical person. For an electronic device, such as a digital camera, having a moving image recording function, the backlight control unit 24 is configured to control switching of the current drive of the backlight 23. In this case, when the backlight control unit 24 controls switching at 20 KHz or less, vibrations of the surrounding parts, such as a capacitor, are propagated to a microphone (not shown) in the electronic device 1, and recorded as audio noise in a frequency region that is audible to a person.

Therefore, in an electronic device having a moving image recording function, the current drive frequency of the backlight 23 needs to be set to be higher than 20 KHz. In an electronic device having a moving image recording function, such as a digital camera, setting the current drive frequency of the backlight 23 in the manner described below can prevent audible audio noise due to switching of the backlight 23 from being recorded.

FIG. 5A is a diagram for illustrating a setting frequency band of a current drive frequency FBL (=1/period TBL) of the backlight 23 when a sub-scanning frequency FTC (=1/period TTC) of the touch panel 19 is the same frequency as the horizontal synchronization frequency. For example, the sub-scanning frequency FTC is set to the same frequency as the horizontal synchronization frequency when also taking the noise caused by gate driving of the TFT pixels of the liquid crystal monitor into consideration. In this case, for example, the current drive frequency FBL is set so as to satisfy the following expression at a frequency lower than the frequency band of the hatched portion obtained by adding a sub-scanning time ISO to the period TTC of the sub-scanning frequency FTC.

$$20\ \text{KHz} < FBL < 1/(TTC + TSC)$$

FIG. 5B is a diagram for illustrating the setting frequency band of the current drive frequency FBL of the backlight 23 when the sub-scanning frequency FTC of the touch panel 19 is in the audible range of 20 KHz or less. In this case, the current drive frequency FBL, needs to avoid being synchronized with the frequency of a multiple of the sub-scanning frequency FTC. At this stage, for example, the current drive frequency FBL, is set so as to satisfy the following expression at a frequency lower than the frequency band of the hatched portion obtained by adding the sub-scanning time TSC to the period TTC/2 of a multiple of (in this example, two times) the sub-scanning frequency FTC, which exceeds the audible range of 20 KHz.

20 KHz<$FBL$<1/(TTC/2+TSC)

FIG. 5C is a diagram for illustrating the setting frequency band of the current drive frequency FBL, of the backlight 23 when the sub-scanning frequency FTC of the touch panel 19 is sufficiently higher than the audible range of 20 KHz. In this case, the current drive frequency FBL, needs to avoid being synchronized with the frequency of a fraction of the sub-scanning frequency FTC. At this stage, for example, the current drive frequency FBL is set so as to satisfy the following expression at a frequency lower than the frequency band of the hatched portion obtained by adding the sub-scanning time TSC to the period 2×TTC of a fraction of (in this example, half) the sub-scanning frequency FTC, which exceeds the audible range of 20 KHz.

20 KHz<$FBL$<1/(2×TTC+TSC)

According to this embodiment, by just setting the drive frequency of the backlight 23 based on the frequency of the period at which the touch panel 19 is controlled, the effects of noise caused by switching of the current of the backlight 23 during capacitance detection at the touch panel 19 can be easily suppressed. As a result, detection errors of a touch operation on the touch panel 19 can be prevented, allowing operability of the touch panel 19 to be improved.

Note that, in FIG. 3 and FIG. 5A, the sub-scanning frequency FTC of the touch panel 19 is set to the same frequency as the horizontal synchronization frequency. However, the sub-scanning frequency FTC of the touch panel 19 may be set to any frequency that exceeds the audible range of 20 KHz. Further, the current drive, frequency FBL, of the backlight 23 is fixed. However, if the current drive frequency FBL of the backlight 23 is to be set so as to satisfy each of the conditions of FIG. 5A, FIG. 5B, and FIG. 5C, the current drive frequency FBL may be arbitrarily set, such as by dynamically varying based on a duty ratio and various operation conditions.

Further, in this embodiment, the touch panel employs a capacitive method. However, the present invention may be applied regardless of the type of method employed for the touch panel, as long as the sensors are successively driven based on scanning lines. In addition, the present invention is not limited to the number of electrodes, the electrode configuration, or the touch operation detection method illustrated in this embodiment. For example, the configuration of the A/D converter and the integration circuit, and the order and existence of data conversion are not limited. In this embodiment, configuration referred as an in-cell touch panel is illustrated as one example. However, the present invention may also be applied to other types of touch panel.

Note that, the control for setting the drive frequency of the backlight 23 to a frequency different from the sub-scanning frequency FTC of the touch panel 19 may be performed by one piece of hardware, or the processing may be spread among a plurality of pieces of hardware.

The present invention has been described above in detail based on the exemplary embodiments thereof, but the present invention is not limited to those particular embodiments, and the present invention encompasses various modes without departing from the gist of the present invention. Further, the above-mentioned embodiments are each merely one embodiment of the present invention, and the respective embodiments can be combined as appropriate.

Further, in the embodiment described above, a case in which the present invention is applied to an electronic device is described, as an example. However, the present invention is not limited to such an example, and may be applied to any device including a touch panel and a display unit. More specifically, the present invention may be applied to a personal computer, a personal digital assistant (PDA), a portable communication terminal, a digital camera, a mobile phone, a portable image viewer, a printer apparatus including a display, a digital photo frame, an audio player, a game machine, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-005077, filed Jan. 14, 2015, which is hereby incorporated by reference herein in its entirety.

What is claimed is:
1. An electronic device, comprising:
a displaying unit configured to display an image,
a backlight;
a capacitive touch panel arranged on a display surface side of the displaying unit, the touch panel comprising a plurality of column electrodes and a plurality of row electrodes, which are arranged orthogonal to each other and are configured to detect a touch operation;

a backlight control unit configured to control a current of the backlight based on pulse width modulation; and a control unit configured to (a) acquire a first frequency for detecting a change amount, as a capacitance change amount, of a signal at each of crossing points between the plurality of column electrodes and the plurality of row electrodes, and (b) cause the backlight control unit to drive the backlight at a second frequency different from a natural number multiple of the acquired first frequency.

2. An electronic device according to claim 1, wherein the second frequency is a higher frequency than an audible range and a lower frequency than the first frequency.

3. An electronic device according to claim 1, wherein the second frequency is a higher frequency than an audible range and a lower frequency than a closest frequency to the audible range among a multiple and a fraction of the first frequency.

4. An electronic device according to claim 1, further comprising a memory unit configured to store information on the first frequency,
wherein the control unit is configured to acquire the information on the first frequency from the memory unit.

5. An electronic device according to claim 1, wherein the second frequency is a lower frequency than the first frequency.

6. An electronic device according to claim 1, wherein the control unit is configured to suppress error detection of the touch operation due to controlling the current of the backlight based on pulse width modulation by causing the backlight control unit to drive the backlight at the second frequency different from the natural number multiple of the acquired first frequency.

7. A method for controlling an electronic device,
the electronic device comprising:
a displaying unit configured to display an image,
a backlight, and
a capacitive touch panel arranged on a display surface side of the displaying unit, the touch panel comprising a plurality of column electrodes and a plurality of row electrodes, which are arranged orthogonal to each other and are configured to detect a touch operation;
the method comprising:
controlling, by a backlight control unit of the electronic device, a current of the backlight based on pulse width modulation;
acquiring a first frequency for detecting a change amount, as a capacitance change amount, of a signal at each of crossing points between the plurality of column electrodes and the plurality of row electrodes; and
causing the backlight control unit to drive the backlight at a second frequency different from a natural number multiple of the acquired first frequency.

8. A non-transitory computer-readable medium having recorded thereon a program for an electronic device,
the electronic device comprising:
a displaying unit configured to display an image,
a backlight, and
a capacitive touch panel arranged on a display surface side of the displaying unit, the touch panel comprising a plurality of column electrodes and a plurality of row electrodes, which are arranged orthogonal to each other and are configured to detect a touch operation;

the program causing a computer of the electronic device to function as:
a unit configured to cause a backlight control unit of the electronic device to control a current of the backlight based on pulse width modulation; and
a unit configured to (a) acquire a first frequency for detecting a change amount, as a capacitance change amount, of a signal at each of crossing points between the plurality of column electrodes and the plurality of row electrodes, and (b) cause the backlight control unit to drive and control the backlight at a second frequency different from a natural number multiple of the acquired first frequency.

9. An electronic device comprising:
a touch panel
a liquid crystal panel;
a backlight;
touch panel controller configured to control a timing detecting a signal from the touch panel; and
a backlight controller configured to PWM control the backlight at a PWM frequency different from a natural number multiple of a frequency for detecting the signal, and wherein
the touch panel is a capacitive touch panel, and includes a plurality of column electrodes and a plurality of row electrodes arranged orthogonal to the column electrodes, and the signal is for detecting a change of a mutual capacitance between the column electrode and the row electrode, wherein
the backlight controller acquires information regarding the frequency, and PWM controls the backlight based on the acquired information.

10. An electronic device according to claim 9, wherein the touch panel is an in-cell touch panel or an on-cell touch panel.

11. An electronic device according to claim 10, wherein the liquid crystal panel includes an electrode operating also as an electrode of the touch panel.

12. An electronic device according to claim 9, further comprising a memory configured to store the information, wherein the backlight controller acquires the information from the memory.

13. A controlling method of an electronic device comprising a touch panel, a liquid crystal panel and a backlight, the method comprising:
controlling a timing for detecting a signal from the touch panel; and
PWM controlling the backlight at a PWM frequency different from a natural number multiple of a frequency for detecting the signal, and wherein
the touch panel is a capacitive touch panel, and includes a plurality of column electrodes and a plurality of row electrodes arranged orthogonal to the column electrodes, and the signal is for detecting a change of a mutual capacitance between the column electrode and the row electrode, wherein
information regarding the frequency is acquired, and PWM controlling of the backlight is based on the acquired information.

14. A non-transitory computer-readable medium having recorded thereon a program for an electronic devise comprising a touch panel, a liquid crystal panel and a backlight, the program causing a computer of the electronic device to function as:
a touch panel controller configured to control a timing for detecting a signal from the touch panel; and a backlight controller configured to PWM control the backlight at a PWM frequency different from a natural number multiple of a frequency for detecting the signal, and wherein the touch panel is a capacitive touch panel, and includes a plurality of column electrodes and a plurality of row electrodes arranged orthogonal to the column electrodes, and the signal is for detecting a change of a mutual capacitance between the column electrode and the row electrode, wherein the backlight controller acquires information regarding the frequency, and PWM controls the backlight based on the acquired information.

* * * * *